United States Patent [19]
Gold

[11] 3,949,655
[45] Apr. 13, 1976

[54] SYNCHRONIZATION APPARATUS FOR BOX MAKING MACHINE

[75] Inventor: Ramon D. Gold, Livingston, N.J.
[73] Assignee: United States Box Corporation, Newark, N.J.
[22] Filed: Oct. 5, 1973
[21] Appl. No.: 404,108

[52] U.S. Cl. ............... 93/49 AC; 93/36 R; 226/44; 318/73; 318/85
[51] Int. Cl.² .......................................... H02P 5/50
[58] Field of Search ............................ 318/41–44, 318/73–75, 85; 226/43, 44; 93/45–48, 61 AC, 49 AC, 53 AC; 53/55, 77; 317/6

[56] References Cited
UNITED STATES PATENTS

| | | | |
|---|---|---|---|
| 1,293,288 | 2/1919 | Wright et al. ............................ | 93/47 |
| 2,418,112 | 4/1947 | De Rosa ................................. | 318/41 |
| 2,834,919 | 5/1958 | Malmros et al. ..................... | 318/42 X |
| 3,049,308 | 8/1962 | Lang .................................... | 226/43 X |
| 3,184,668 | 5/1965 | Whitecar .............................. | 318/85 |
| 3,206,641 | 9/1965 | Leeson, Jr. et al. ................. | 317/6 |
| 3,485,426 | 12/1969 | Apicella .............................. | 226/43 X |

*Primary Examiner*—Roy Lake
*Assistant Examiner*—Neil Abrams
*Attorney, Agent, or Firm*—Friedman & Goodman

[57] ABSTRACT

A box making machine includes a supply roll of a continuous web whose tension is monitored by a pivotally mounted oscillating rod which guides the web by means of a dancer roller provided at one end thereof. The web is carried through an imprinting machine which prints information on the web before it is passed through a die press which punches out portions of the web at predetermined locations on the latter. A cutter machine is provided which cuts the web into blanks suitable to be formed into boxes. The cutter machine includes a drive motor for actuating the cutter and for advancing the web from the supply roll. A box forming machine is provided for operating on the blanks and for forming the same into boxes. The box forming machine includes a drive motor for actuating the box forming machine. A synchoronization circuit, including cams mounted for rotation with respective operation of the drive motor in the cutter and box forming machines, is provided for synchronizing the operation of the cutter machine with the box forming machine independently of the fluctuations in the operation of the respective drive motors. Switches are provided for controlling the operation of the printing machine and die press to actuate the operation of the latter during the cutting step of the cutter machine. Switches, associated with the synchronization circuit, are also provided at extreme positions of the oscillating rod to detect excessively low or high tensions in the web to terminate the operation of the cutter machine and thereby also the operation of the printing and die press machines.

12 Claims, 12 Drawing Figures

SYNCHRONIZATION APPARATUS FOR BOX MAKING MACHINE

BACKGROUND OF THE INVENTION

The present invention generally relates to automated machinery, and more particularly to a box making machine which includes synchronization apparatus for synchronizing the various steps of the box forming process.

Automated machinery, including box forming machines, is well known wherein a raw or semi-finished material is carried through a series of steps to form a finished product. However, the automated machinery under discussion generally comprises of a plurality, or even numerous, number of individual separate machines which are successively disposed in a desired manner. Many of these component machines are frequently provided with independent drive means. With such arrangements, there arises the problem of synchronizing the operation of the machines in the chain to permit continuous and orderly production of the finished product. It is apparent that when any component machine falls out of synchronism with the balance of the machines, the entire chain is disrupted and synchronization must be restored before normal operation can resume. Component machines tend to fall out of synchronism when independently driven even if the drive means, in the form of motors, are operated on the same power lines whereby the frequency and voltage of the lines are the same. This results from slight variations in specifications of the machines, the loads applied to the machines as well as wear and frictional forces applied to the machines.

One approach to remedy the problem of synchronization is to operate all the component machines off a single drive motor which is mechanically coupled to each of the component machines. However, such an arrangement may require a very large drive motor. Further, such an arrangement requires mechanical coupling from the single motor to the individual component machines which increases the complexity, and therefore the cost, of the overall machine.

SUMMARY OF THE INVENTION

Accordingly, it is an object of the present invention to provide a box making machine which is not possessed of the above described disadvantages associated with comparable prior art machines.

It is another object of the present invention to provide a box making machine which is simple in construction and economical to manufacture.

It is still another object of the present invention to provide a box making machine which is composed of component machines which are individually driven by separate drive motors which are, however, maintained in synchronism.

It is yet another object of the present invention to provide a synchronization apparatus for a box making machine which synchronizes the operation of independently driven component machines of a box making machine.

It is a further object of the present invention to provide a box making machine which includes imprinting, die press and cutting machines and synchronization means for actuating the imprinting and die press machines during the cutting stroke of the cutter machine.

It is still a further object of the present invention to provide a box making machine including a cutter machine and a box forming machine and synchronization means for synchronizing the operation of the two latter machines to permit conveyance of the blanks cut by the cutter machine into the box forming machine.

It is yet a further object of the present invention to provide a cutter machine for cutting blanks to be formed into boxes in a box forming machine which receives these blanks, and synchronizing means for terminating the operation of the cutter machine whenever the latter moves out of synchronism with the box forming machine.

In order to achieve the above objects, as well as others which will become apparent hereafter, a box making machine in accordance with the present invention comprises supply means for supplying a continuous web of material out of which the boxes are to be formed. Die press means is provided for punching out portions of the web at predetermined locations of the latter and cutter means is provided for cutting the web into blanks suitable for forming the boxes. Said cutter means includes first drive means for actuating said cutter means and for advancing the web. Box forming means is provided for operating on the blanks and for forming the same into boxes. Said box forming means includes second drive means for actuating said box forming means. Synchronizing means is provided for synhcronizing the operation of said box forming means with said cutter means independently of fluctuations in the operation of said first and second drive means. The box making machine may also comprise imprinting means for printing information on the web before the latter is cut by said cutter means.

In the presently preferred embodiment, said first and second drive means comprise motors whose speeds may fluctuate from a nominal speed. Said synchronizing means comprises first detection means for detecting a first portion of every cycle of said box forming means. Second detection means is provided for detecting a second portion of every cycle of said box forming means. Third detection means is provided for detecting a portion of every cycle of said cutter means. Synchronization in accordance with the scheme of the present invention is attained only when detection takes place successively by said first, third and second detection means respectively without simultaneous detection by said second and third detection means. Said synchronization means further includes circuit means for initiating the operation of said cutter means in response to each detection by said first detection means of said first cycle portion of said box forming means and for terminating the operation of said cutter means only upon detection by said second detection means of said second portion of a cycle of said box forming means prior to or simultaneously with detection by said third detection means of said portion of the cycle of said cutter means.

Advantageously, said first and second detection means comprise first and second cam means mounted for common rotary movement, each cam means completing one full turn for each full cycle of said box forming machine. Said third detection means comprises third cam means mounted for completing one full turn for each full cycle of said cutter means. Said circuit means includes switches each having an actuator engageable with a land of a respective cam means. The synchronization means of the present invention, while described in connection with the box making machine, can be utilized in connection with any automated machine which includes a plurality of individually driven component machines.

BRIEF DESCRIPTION OF THE DRAWINGS

With the above and additional objects and advantages in view, as will hereinafter appear, this invention comprises the devices, combinations and arrangements of parts hereinafter described and illustrated in the accompanying drawings of a preferred embodiment in which:

FIG. 3 is an end view of cams associated with the box forming machine of FIG. 1 and forming part of the synchronization apparatus in accordance with the present invention;

FIG. 5 is similar to FIG. 3, but showing an end view of the cam associated with the cutter machine of FIG. 1;

FIG. 9 is similar to FIG. 8 but showing the cyclical operation of another cam associated with the box forming machine and mounted for common rotation with the first cam with which FIG. 8 is associated;

DESCRIPTION OF THE PREFERRED EMBODIMENTS

Figure 1:
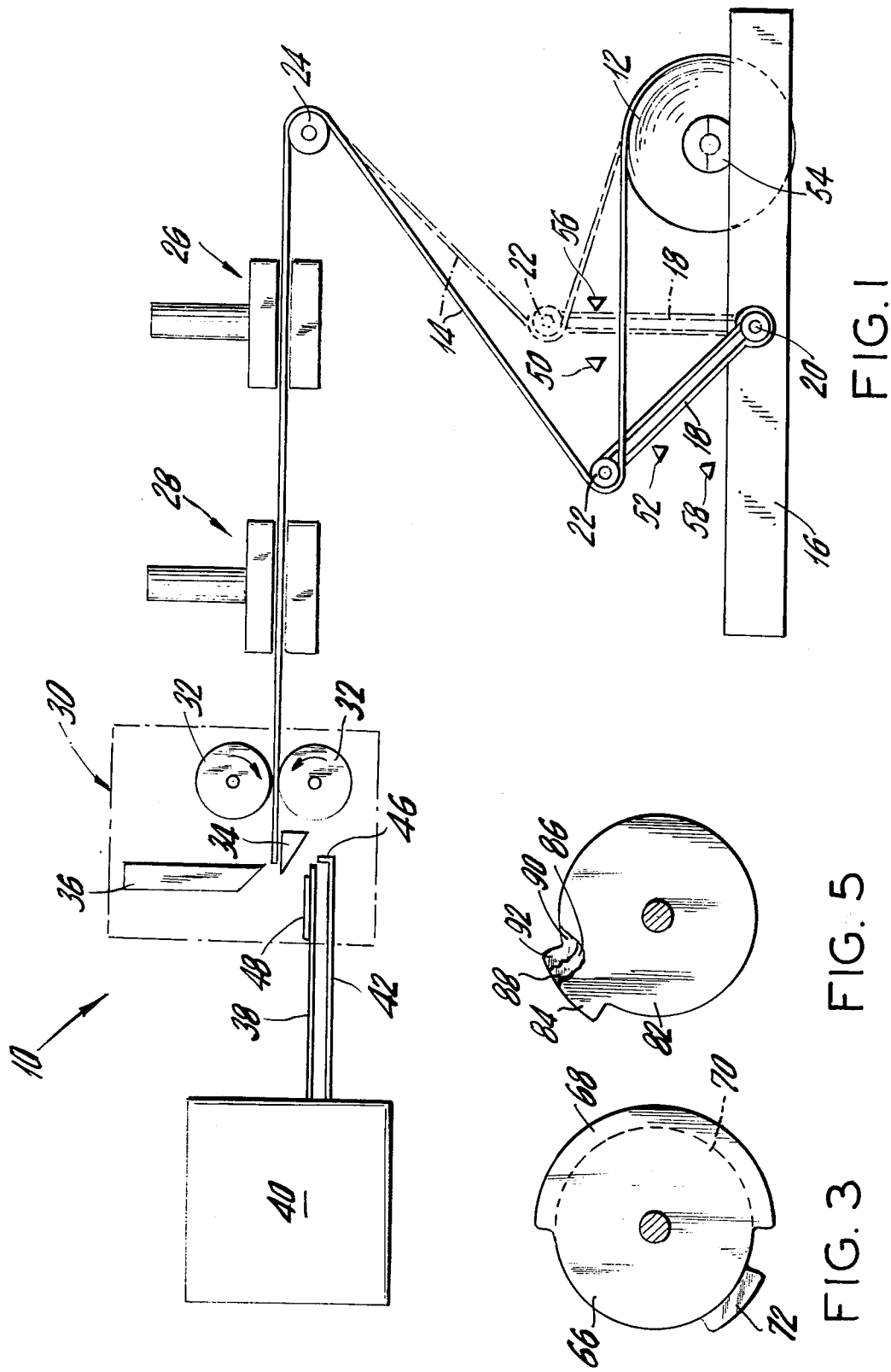
FIG. 1 is a schematic representation of a box making machine formed of individually driven component machines including an imprinting machine, a die press machine a cutter machine and a box forming machine.

The present invention will now be described with reference to the FIGURES, wherein similar or identical parts have been designated by the same reference numerals throughout, and first referring to FIG. 1, a box making machine in accordance with the present invention is generally designated by the reference numeral 10. The box making machine 10 includes a plurality of component machines, to be described, each of which may be driven by an independent drive means in the form of a motor. The motors which operate the individual or component machines are preferably driven from a common power line and rated at the same nominal speeds. The synchronization apparatus to be described synchronizes the operation of the individual component machines when the motors of the individual drive means fluctuate from the nominal speed. The box making machine 10 operates most continuously and efficiently when the separate drive motors are in full synchronism. However, fluctuations from the nominal speed still permit synchronous operation, as to be described, but the drive motors of one or more of the component machines may be required to be turned off at various portions of the box making cycle. For this reason, it is important that the speed fluctuations of the motors associated with each of the component machines do not excessively deviate from the nominal speed. When excessive deviations take place, one or more of the drive motors may need to be turned off every one or every several cycles to maintain synchronization, this representing a loss in efficiency and increase in wear on the mechanical and electrical parts of the machine.

The box making machine 10 includes a supply or feed roll 12 which supplies a web 14 out of which the boxes are to be formed. The supply roll 12 may be rotatably mounted on a frame 16.

Figure 9:
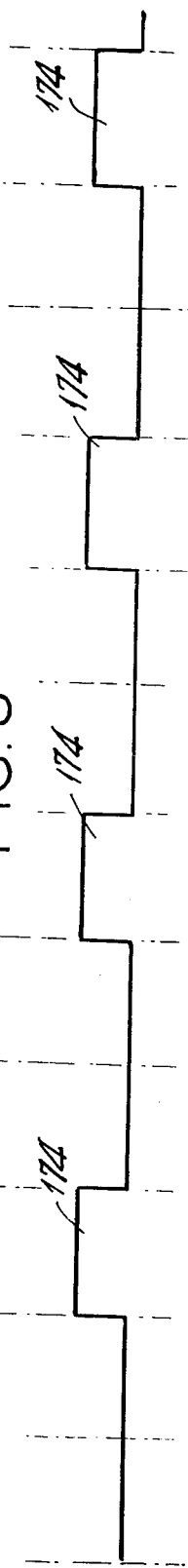

An oscillating rod or tension monitoring rod 18 is provided which is pivotally mounted at one end about a pivot point 20. The oscillating rod 18 is provided at the other end thereof with a dancer roller 22 around which the web 14 is guided as shown in FIG. 1. By extending the web 14 below the dancer roller 22 and subsequently raising the web upwardly, the web supports the oscillating rod 18 in one of the variable angular positions about the pivot point 20 depending on the tension in the web. As the tension in the web is increased, the oscillating rod 18 is pivoted in a clockwise direction, as viewed in FIG. 9 and as suggested by the dashed outline. On the other hand, when the tension in the web 14 is decreased, the oscillating rod 18 pivots about the pivot point 20 in a counter-clockwise direction, as viewed in FIG. 1. Rotary movements of the oscillating rod 18 actuate switches which form part of the synchronization circuit, to be described, which help to regulate the tension in the web 14 to a desired range of values.

The web 14 is carried around an idler roller 24 and caused to extend or pass through an imprinting machine 26, a die punch or die press machine 28 and a cutter machine 30. The imprinting machine 26 is provided for printing information on the web before the latter is cut by the cutter machine 30. Clearly, the imprinting machine 26 is optional and need not be utilized when information need not be printed on the boxes or when the web 14 is preprinted with the desired information.

Figure 2:
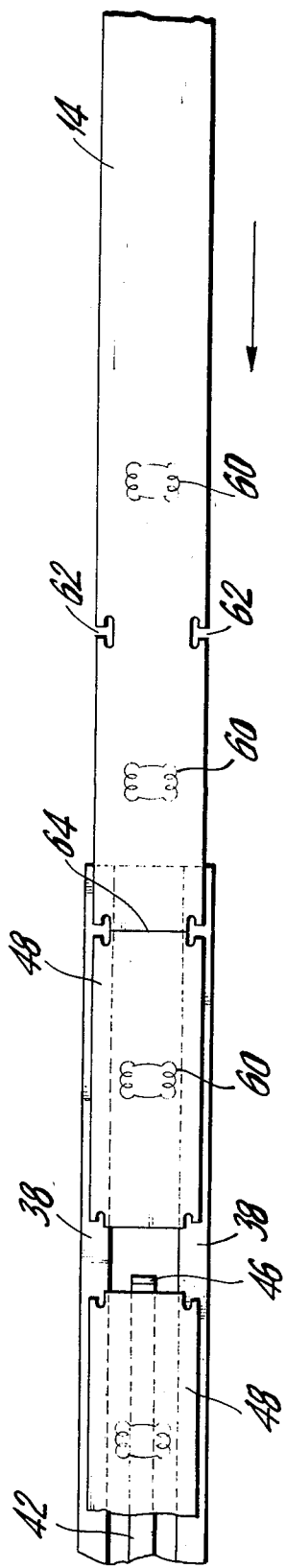
FIG. 2 is a top plan representation of the web shown in FIG. 1 disposed in a single plane to indicate the various steps performed upon the web by the component machines of FIG. 1.

The die press or die punch machine is provided for punching out portions of the web 14 at predetermined locations of the latter to preshape the blanks to a desired configuration to permit and facilitate the assembly of the boxes, as suggested in FIG. 2.

The cutter machine 30 includes a pair of pinch rollers 32 disposed on opposing sides of the web 14 which frictionally engage the web and cause the same to advance whenever the pinch rollers are actuated in a direction of the arrows. The pinch rollers 32 advance the web to a cutting table 34 where a suitable cutting blade 36 cuts a predetermined length of the web into a blank for forming a box. The pinch rollers 32 and the blade 36 are advantageously actuated by a common drive motor to assure appropriate synchronization between the pinch rollers and the blade. The specific mechanical arrangement for driving the pinch rollers 32 and the blade 36 from the same drive means is not a critical feature of the present invention. Cutter machines are known and available which perform the functions described above in connection with the cutter machine 30.

It should be clear from the above description that actuation of the pinch rollers 32 and consequent tensil forces applied to the web 14 to advance the latter are transmitted throughout the web. The pinch rollers 32 have the effect of advancing the web 14 from the supply roll 12 and through the imprinting machine 26 and the die press 28. To the extent that the web 14 is not stretched, the movement of the web 14 can be considered to be responsive to the action of the pinch rollers 32.

A support rail 38 extends between the cutting machine 30 and a box forming machine 40 for supporting and permitting slidable movement of blanks from the cutting machine to the box forming machine. A reciprocating arm 42, forming part of the box forming machine 40 and actuated by the drive means of the latter, is provided with an upwardly projecting lip 46 at the end of the arm closest to the cutting machine 30. The reciprocating arm 42 initially extends in the direction of the machine 30 at a level below the support rail 38 to prevent engagement of the lip 46 with a blank 48 which may be disposed upon the rail. Once fully extended, the reciprocating arm 42 is raised to bring the lip 46 at least to the level or height of the blank 48 and the return stroke of the reciprocating arm 42 slides the blank 48 on the rail 38 into the box forming machine 40 by engagement of the lip 46 with the blank 48. Return of the reciprocating arm 42 towards the cutting machine 30 is again at the lower level mentioned above so that the blanks 48 are always moved from the position of the region of the cutting machine 30 towards the box forming machine 40. One of the primary objects or purposes of the synchronizing apparatus of the present invention is to synchronize the generation of the blanks 48 to correspond with the movement of the reciprocating arm 42 which feeds the blanks to the box forming machine 40. Loss of synchronism in this connection may result in blanks being missed or may cause multiple blanks to be fed to the box forming machine. Both conditions are unsatisfactory and are eliminated by the present invention.

As mentioned above, the tension in the web 14 is a function of the rate at which the pinch rollers 32 advance the web. However, the tension in the web 14 is also a function of the rate at which the supply roll 12 is permitted to unwind. Regulation of the supply roll 12 is effected by a pair of switches 50 and 52 which electrically regulate an air clutch 54 which operates upon the supply roll 12. The switch 50 is angularly positioned approximately 80° with respect to the horizontal while the switch 52 is disposed at approximately 30°. Clearly, these angular quantities are not critical and any other suitable quantities may be selected, with different degrees of advantage. When the tension in the web 14 increases to bring the oscillating rod 18 proximate to the switch 50, the rod engages the actuator of the switch and actuates the unwind clutch 54 which permits the roll 12 to unwind. Unwinding of the supply roll 12 causes the oscillating rod 18 to rotate in a counterclockwise direction about the pivot point 20. When movement of the oscillating rod 18 brings the latter to the position of the switch 52, engagement of the rod with the actuator of the switch 52 stops the operation of the clutch 54 and further unwinding of the supply roll 12 is prevented. In this manner, the tension in the web 14 is regulated. The pinch rollers 32 take up the slack in the web 14 to thereby return the oscillating rod 18 towards the switch 50. At this point, the supply roll is again unwound a suitable amount to bring the oscillating rod 18 adjacently to the switch 52. Upon contact, the supply roll 12 is fixed and the cycle is repeated by the increase in tension in the web 14 effected by the pinch rollers 32.

A further pair of switches 56 and 58 are provided which cooperate with the oscillating rod 18. The switch 56 is disposed beyond the switch 50 with respect to the normal positions of the rod 18 while the switch 58 is disposed beyond the switch 52 with respect to the rod. The switches 56 and 58 are provided to turn off the cutter machine 30 when the tension in the web 14 is excessively high or low. As described above, the normal tensions of the web 14 carry the oscillating rod 18 between the angular positions represented by the switches 50 and 52. When the oscillating rod 18 moves beyond the switches 50, 52, this represents an abnormal situation which normally requires the turning off of the cutter machine 30 to investigate the problem. Accordingly, the switches 56 and 58 cooperate with the cutter machine 30, in a manner to be described hereafter.

Referring to FIG. 2, the web 14 is shown in a planar disposition to indicate the various operations performed on the web by the machine 10 described in FIG. 1. Thus, the web 14 is first imprinted with a design or informative material 60 by the imprinting machine 26. The die press 28 forms die cuts 62 in the web and the cutter machine 30 cuts the web 14, such as at 64.

As shown in FIG. 2, the blank 48 can drop on the support rail 38 subsequent to being cut. The reciprocating arm 42, with its upwardly projecting lip 46, is suitable for engaging the blank 48 and for slidably moving the same from the position of the cutting machine 30 towards the box forming machine 40.

The synchronizing apparatus of the present invention is necessitated, as suggested above, by the use of independent drive means for the individual or component machines. One of the major objects of the present invention is the synchronization of the drive motor of the cutter machine 30 with the drive motor of the box forming machine 40. As described above, the drive motor for the cutter 30 operates the pinch rollers 32 as well as the blade 36. On the other hand, the drive motor for the box forming machine 40 operates the elements which form the boxes as well as the reciprocating arm 42 which draws the blanks into the box forming machine. Since the two drive motors under discussion may fluctuate from a nominal speed, it is important to monitor the operation of each machine. Referring to FIGS. 3–6, the synchronizing apparatus of the present invention includes a cam 66 provided with a cam land 68. The cam 66 is coupled to the drive motor of the box forming machine 40 and makes one full revolution for each full cycle of the box forming machine 40. The angular area or portion of the cycle which the land 68 represents is not itself critical, as will be described hereafter. A second cam 70 is mounted for common rotation with the cam 66 and is provided with a land 72 which represents a second portion of a cycle of the box forming machine. Again the specific angular span of the cam land 72 or its exact angular disposition relative to the land 68 is not critical. It is only important, as will become apparent hereafter, that the leading edge of the land 72 be angularly spaced from the trailing edge of the land 68. This will be more further described hereafter. Cooperating with the cam 66 is a normally open switch 74 whose actuator 76 closes the switch 74 when engaged and depressed by the land 68. Similarly, a normally closed switch 78 is provided which is opened only upon engagement and depression by the land 72.

Figure 6:
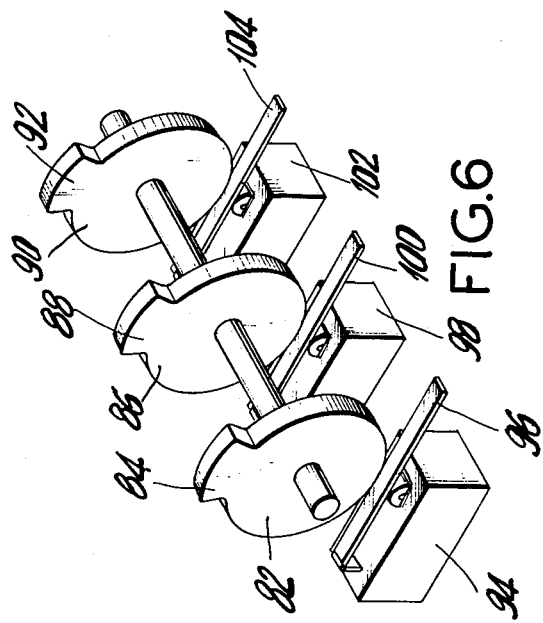
FIG. 6 is similar to FIG. 4, but showing the cams of FIG. 5 associated with the cutter machine and forming part of the synchronization apparatus.
Figure 4:
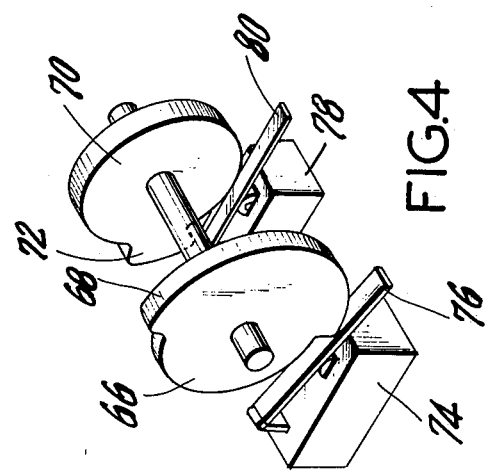
FIG. 4 is a perspective view of the cams shown in FIG. 3, illustrating the manner in which the lands of the cams cooperate with switches forming part of the synchronization apparatus of the present invention.

While the cams 66 and 70 are associated with the drive means of the box forming machine 40 and each make one full revolution for each full cycle of the latter machine, a further set of cams are provided which cooperate with the drive motor of the cutter machine 30 and each make one full revolution for each cycle of the cutter machine. Referring to FIGS. 5 and 6, a cam 82 is shown which is provided with a cam land 84 suitable for engaging an actuator 96 of a normally closed switch 94. Mounted for common rotary movement with the cam 82 are cams 86 and 90 respectively provided with lands 88 and 92. The land 88 is adapted to engage an actuator 100 of a switch 98 while the land 92 is adapted to engage an actuator 104 of a switch 102. The switches 74, 78 and 94 form part of the synchronizing circuit of the present invention, as to be more fully described in connection with FIG. 7. The switches 98 and 102 cooperate with the drive means of the imprinting machine 26 and die press 28. By positioning the land 84 on the cam 82 to correspond to that portion of the cycle of the cutter machine 30 where the blade 36 cuts the web or the cutting stroke, the land 88 and 92 can correspondingly be positioned to simultaneously actuate the imprinting machine 26 and die press 28. In this manner, the stamping or imprinting machine 26 and the die press 28 are actuated simultaneously with the cutting of the blank. Accordingly, the die cuts 62 as well as the imprinting 60 is clearly formed without defects due to imprinting or die punching while the web is advanced by the pinch rollers 32.

Figure 7:
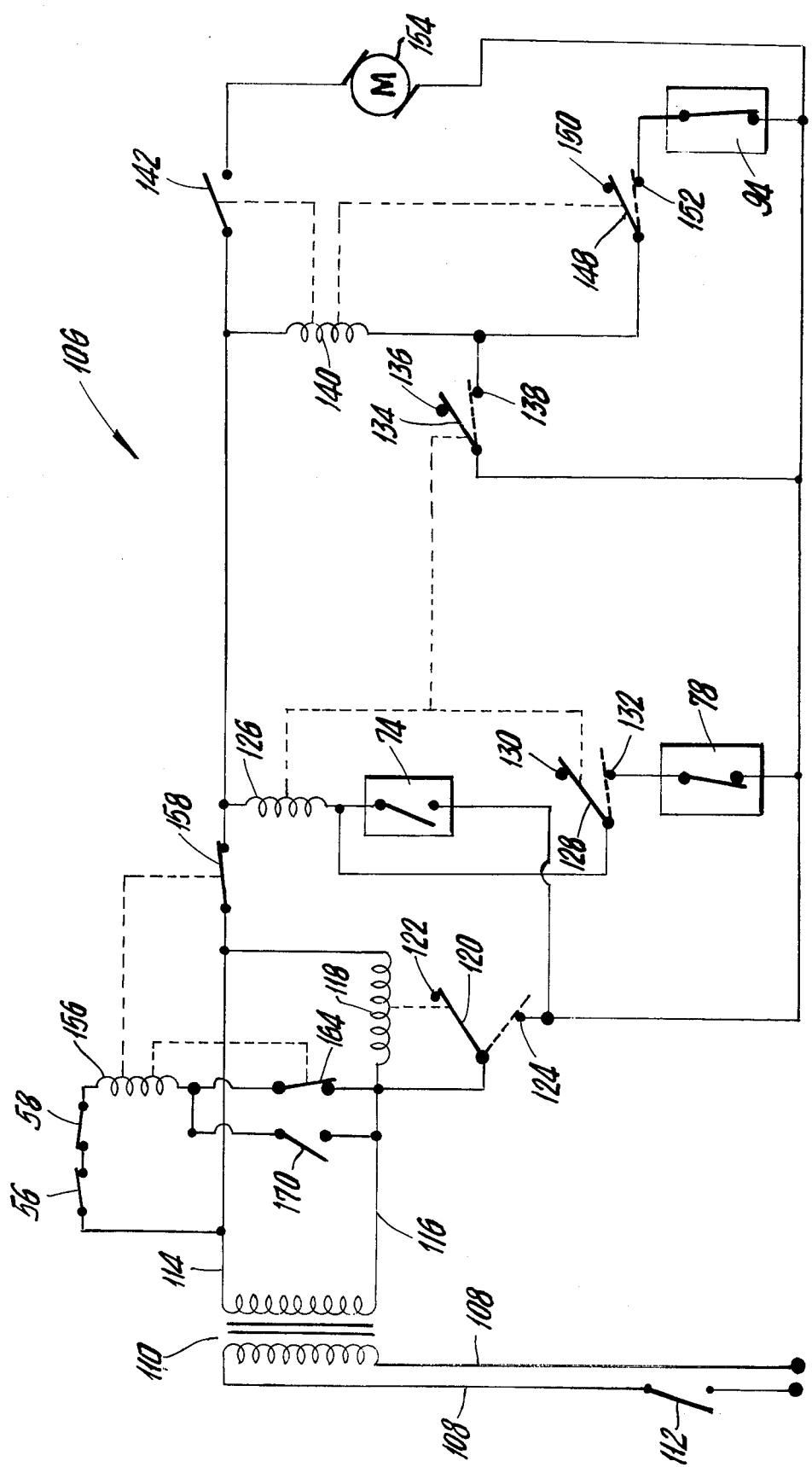
FIG. 7 is an electrical schematic of the circuit forming the synchronization apparatus of the present invention for synchronizing the operation of the box forming and cutter machines of FIG. 1, and further including safety stop means for terminating the operation of the machine when the tension in the web becomes excessively high or low.

Referring to FIG. 7, the synchronizing circuit of the present invention is shown schematically and generally represented by the reference numeral 106. The circuit 106 includes power lines 108 connected to the primary winding of a transformer 110 at one end and connectable to a source of electrical power at the other end. An on-off switch 112 is provided for interrupting the power applied to the transformer.

The secondary winding of the transformer 110 includes leads or conductors 114 and 116 across which conductors the reduced voltage applied to the electrical circuit 106 is provided.

Connected across the conductors 114 and 116 is a power on-off relay coil or winding 118. The relay coil 118 is associated with a movable contact 120 and two fixed contacts 122 and 124. When the on-off switch 112 is closed, the movable contact 120 is caused to disengage the contact 122 and to engage the contact 124.

A relay coil 126 is connected to the conductor 114 and connected to the contact 124 by means of the normally open switch 74 engageable by the cam 66. The relay coil 126 actuates a movable contact 128 when the coil is energized to move the movable contact from engagement with the fixed contact 130 into engagement with the fixed contact 132. The normally closed switch 78, engageable by the cam 70, is connected between the contacts 124 and 132. The relay coil 126, when energized, also actuates a movable contact 134 which moves from engagement with the fixed contact 136 into engagement with the fixed contact 138.

A motor relay coil 140 is connected between the conductor 114 and the fixed contact 138, the latter also being connected to a movable contact 148 which is actuated upon energization of the coil 140 to move from the fixed contact 150 to the fixed contact 152. The normally closed switch 94, actuatable by the cam 82, is connected between the contact 152 and the contact 124. The relay coil 140, when energized, also closes a normally open switch 142 to cause the same to close to thereby complete the circuit for a motor 154 which is the motor for the cutter machine 30.

The operation of the electrical circuit 106 described above will now be described. Upon closing of the on-off switch 112, the relay coil 118 is energized and the fixed contact 124 is connected to the conductor 116. However, the motor 154 remains turned off because of the open condition of the switch 142.

Turning on the box forming machine 40 causes the cams 66 and 70 to rotate one full revolution for each full cycle of the box forming machine. When the land 68 engages the actuator 76 of the switch 74, the switch 74 closes to thereby apply the secondary voltage across the relay coil 126. Applying electrical energy to the relay coil 126 causes the movable contact 128 to engage the contact 132 and movable contact 134 to engage the contact 138. Since the switch 78 is normally closed, the relay coil is latched and remains energized irrespective of a subsequent opening of the switch 74. Simultaneously with the energization of the relay coil 126, the relay coil 140 is energized by the movement of the movable contact 134 into engagement with the contact 138. Applying energy to the relay coil 140 closes the switch 142 and causes the movable contact 148 to engage the contact 152. Accordingly, the motor 154 of the cutter machine 30 is energized and this condition if fixed by the latching effect of the switch 94 and the engaging relationship of the contacts 148 and 152.

Actuation of the motor 154 causes the web 14 to be drawn through the component machines by the pinch rollers 32 and causes the cams 82, 86 and 90 to simultaneously turn one full revolution for each full cycle of the cutter machine. When the land 84 engages the actuator 96 of the normally closed switch 94, designating the cutting stroke of the cutter machine, the motor 154 nevertheless continues to operate by virtue of the continuing engaging relationship between the movable contact 134 and fixed contact 138. Thus, as long as the relay coil 126 remains energized, opening of the switch 94 has no effect and the motor 154 continues its operation.

With the switch 94 closed, subsequent to the cutting stroke of the machine 30, engagement of the actuator 80 of the normally closed switch 78 with the land 72 causes the relay coil 126 to become unlatched, moving contact 128 into engagement with contact 130 and contact 134 into engagement with contact 136. However, the relay coil 140 and the motor 154 remain energized by the latching connection of the contacts 148 and 152 and the closed switch 94.

A full cycle of the machine 10 is renewed upon engagement of the land 68 with the actuator 76 of the normally open switch 74, whereby the relay coil 126 is again energized and the movable contacts 128 and 134 are again brought into engagement with respect to fixed contacts 132 and 138. Again, opening of the switch 94 at this point has no effect and the motor 154 remains in operation.

The above described sequence corresponds to a synchronous condition between the drive motors of the cutter machine 30 and the box forming machine 40. It will be noted that the purpose for the switch 74 is to trip the motor 154 of the cutter machine 30 at the beginning of each cycle by energizing the relay coils 126 and 140 and latching the same. When the cutter and box forming machines are in synchronism, the normally closed switch 94 must be opened and closed by the land 84 prior to opening of the normally closed switch 78 by the land 72. When the machines are out of synchronism, a condition arises, after a few or a numerous number of cycles of the machines, wherein both normally closed switches 78 and 94 are simultaneously opened or wherein the normally closed switch 78 is opened prior to the opening of the normally closed switch 94. In each of these conditions, the relay coil 140 will become deenergized, with attendant opening of the switch 142 and denergization or deactivation of the motor 154. This will be more fully described in connection with FIGS. 8–12.

An additional circuit, comprising a relay coil 156, may be connected across the conductors 114 and 116 by means of the series-connected, normally closed switches 56 and 58. The relay coil 156 actuates a normally open switch 164 which closes to the position shown in FIG. 7 when energy is supplied across the relay coil 156. As described in connection with FIG. 1, the switches 56 and 58 designate excessive movements of the oscillating rod 18 and indicate excessively low or high tensions in the web 14. When such a condition arises, one of the switches 56 or 58 is opened to deenergize the relay coil 156. Upon this occurrence, the switch 164 opens to remove energy from the relay coil 156. The relay coil 156 also actuates, when energized, a normally open switch 158 which is connected in series with the conductor 114. Consequently, deenergization of the relay coil 156 removes the power from the relay coils 126 and 140 and prevents the activation of the motor 154. Translated to FIG. 1, such an arrangement causes the drive motor of the cutter machine 30 to be turned off whenever the oscillating rod 18 reaches an abnormal angular orientation wherein one of the switches 56, 58 is actuated. After the cause for the abnormal tension condition in the web has been determined and remedied, the switches 158 and 164 can again be closed by depression of a temporary contact reset switch 170 which is in parallel with the switch 164. With switches 56 and 58 closed, closing of switch 170 energizes the relay coil 156, this latching the relay coil 156 by means of the now closed switch 164 and permits the operation of the synchronizing electrical circuit 106 as described above by means of the now closed switch 158.

Figure 8:
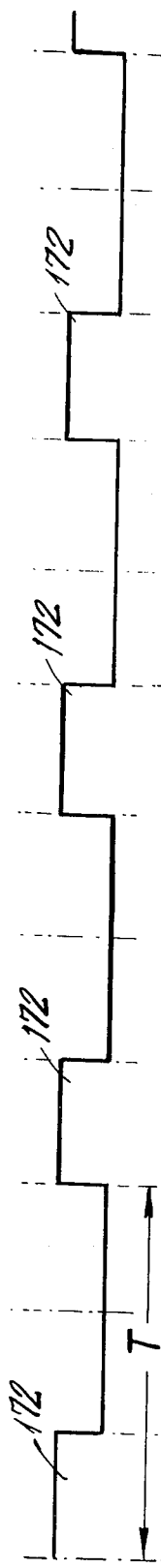
FIG. 8 is a graphical representation of the cyclical activity of one cam associated with the box forming machine.

The operation of the synchronizing apparatus for the box making machine will not further be described in connection with FIGS. 8–12. In FIG. 8 a set of pulses 172 are shown which have a period designated by T. Each period T represents one full revolution of the cam 66, this further representing one full cycle of the box forming machine 40. For purposes of illustration, each pulse 172 corresponds to 120° or one-third of each cycle. The pulses 172 correspond to the angular degrees extended by the land 68. Thus, to obtain pulses 172 as shown in FIG. 8, the land 68 must include an angle of 120° out of the 360° of the cam 66. For purposes of illustration, and referring to FIG. 9, a train of pulses 174 as depicted which represent engagement between the land 72 and the actuator 80 of the switch 78. Again, each pulse 174 represents 120° or one-third of the cycle of the box forming cycle. While the land 68 is shown to engage the actuator 76 for one-third at the beginning of each cycle, the land 72 engages the actuator 80 for the last third of each cycle.

Figure 10:
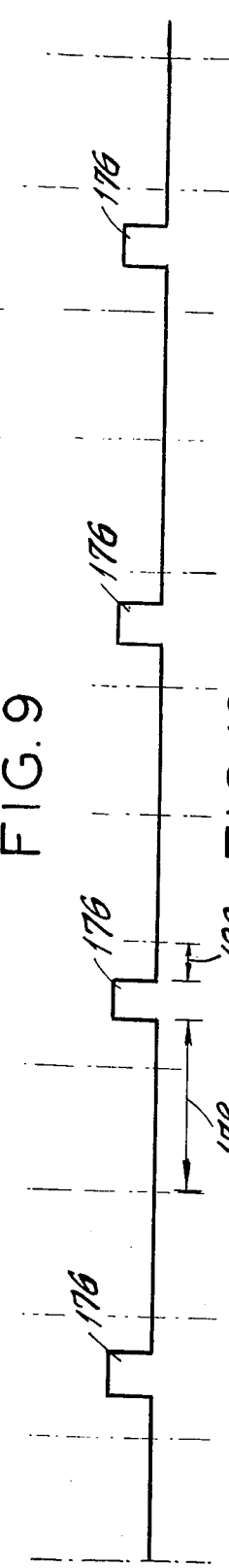
FIG. 10 is a graphical representation of the cyclical activity of a cam associated with the cutter machine which is driven independently from the drive mechanism utilized to drive the box forming machine, FIG. 10 depicting a condition wherein the two drive mechanisms are in synchronism whereby the machines can continuously operate in an orderly manner.

In FIG. 10, a series of pulses 176 are shown which represent the engagements of the actuator 96 of the switch 94 by the land 84. Thus, while the pulses 172 and 174 are representative of the operation of the box forming machine 40 drive means, the pulses 176 are representative of the drive means of the cutter machine 30. The pulses 176 have the same period T as do the pulses 172 and 174. Accordingly, the box forming and cutter machines are in synchronism and orderly continuous operation of the box forming machine 10 can take place. It will be noted that the necessary sequence is provided whereby the motor 154 of FIG. 7 can remain continuously on. In each cycle, the switch 74 initially closes for the duration of the pulses 172. After one-third of the cycle of the box forming machine 40, the switch 72 is again opened. However, the relay coils 126 and 140 are latched so that the motor 154 remains in the on condition. After approximately one more ninth of the cycle of the box forming machine, a pulse 176 appears indicating that the switch 94 is temporarily opened by the cam land 84. The switch 94 remains open for approximately one-ninth of a cycle of the box forming machine 40. Approximately one-ninth of the cycle subsequent in time to the closing of the switch 94, representing approximately 40° of the 360° of each cycle, the switch 78 is opened by the land 72 for approximately one-third of a cycle of the box forming machine. The cycle is repeated in this manner so long as the drive means for both the box forming machine 40 and cutter machine 30 remain at the nominal speeds. As described above, when the switches 74, 94 and 78 are successively actuated without simultaneous actuation of the switches 78 and 94, the relay 154 continues to be energized and the motor 154 remains in operation without interruption.

Figure 11:
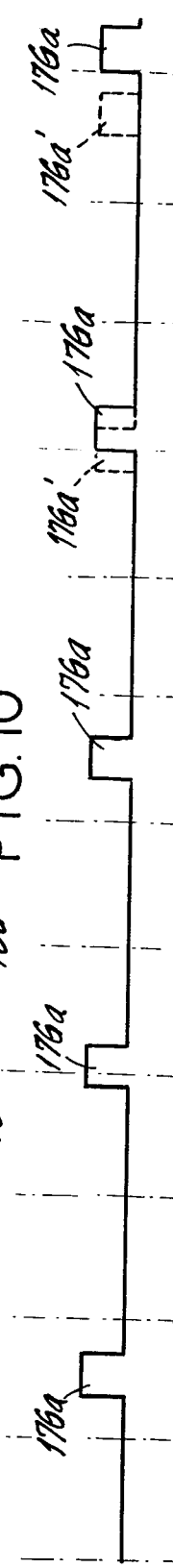
FIG. 11 is similar to FIG. 10 but showing the cam associated with the cutter machine turning at a rate which is higher than that associated with the cams of the box forming machine shown in FIGS. 8 and 9, showing the manner in which the synchronizing apparatus of the present invention causes the cutter machine to operate in synchronism or at the same rotary speed as the box forming machine.

In FIGS. 10 and 11, two conditions are respectively indicated wherein the speed of the cutter machine motor 154 decreases below and increases above the nominal speed of the motor of the box forming machine 40. While it is possible for the motor of the box forming machine 40 to fluctuate, the speed of that machine is taken as the reference or standard, and it is the motor 154 which must follow the speed of the motor of the box forming machine. Changes in speed of one of the motors will cause the synchronizing circuit 106 to bring the speed of the cutter motor 154 into synchronism with the speed of the motor of the box forming machine 40.

For purposes of illustration, the period T will be taken to correspond to a speed of 30 strokes or revolutions per minute. In FIG. 11, wherein the speed of the motor 154 is higher than desired, the period or spacing between the pulses 176a is smaller. As described above, the motor 154 is deenergized when there is an overlap between the pulses 174 and 176 or when the switches 78 and 94 are simultaneously open. Since the pulses 176a are advanced a predetermined number of degrees in each cycle relative to the synchronous pulses 176, a condition can result wherein both switches 78 and 94 are simultaneously open after one or more cycles of the cutter motor 154. Each cycle of the motors shifts the pulses 176a relative to the pulses 174 until a condition of coincidence occurs with resulting deactivation of the motor 154.

The spacing between the pulses 176a correspond to a frequency of 36 strokes or cycles per minute. With the initial pulse 176a aligned with the initial pulse 176 it will be noted that coincidence occurs between the pulse 176a' and the pulse 174 during the third cycle of the cutter motor 154. This is designated by the dashed outline 176a'. When the pulse 172 begins, corresponding to a closing of the switch 74, the relay coil 140 is again energized and the motor 154 is again actuated. This is again designated by the pulse 176a. Subsequently, each cycle of the motor 154 causes the coincidence, designated by 176a', and the cutter motor is not permitted to be energized until the box forming machine 40 motor initiates the cycle by the closing of the switch 74.

Figure 12:
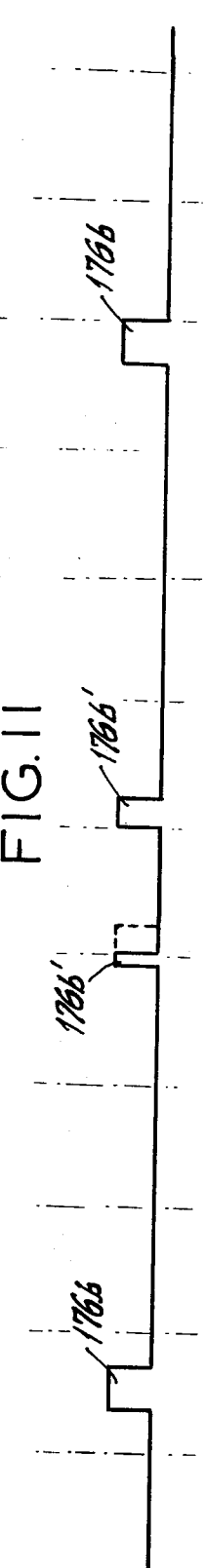
FIG. 12 is similar to FIGS. 10 and 11, but showing the effect of the cutter machine operating at a slower rate than that associated with the box forming machine, showing the manner in which the two machines are brought into synchronism by the synchronizing apparatus of the present invention.

When the cutter machine motor 154 decreases in speed, the spacing between the pulses increases, as indicated by the pulses 176b in FIG. 12. The pulses 176b correspond to a frequency of 25.7 strokes per minute. It will be noted that the pulse 176b' coincides with the pulse 174 after a single cycle of the motor 154. Accordingly, the motor 154 is turned on and is again initiated upon the formation of the pulse 172 or the closing of the switch 74. The balance of the cycle, corresponding to the balance of the land 84, is formed upon the occurrence of the pulse 172. The pulses 176b will now advance successively during each step towards the pulses 174 for six cycles before the motor 154 is again turned off.

The number of cycles which are required to turn off the machine 154, by simultaneous actuation of switches 78 and 94, can be predicted by the following relationship:

$$N = \left(\frac{f_2}{f_2 - f_1}\right)\left(\frac{s}{360}\right)$$

In the above formulation, N represents the number of cycles required to turn the motor 154 off when there is a synchronous operation of the cutter machine 30 and the box forming machine 40. The quantity $f_1$ represents the basic frequency of the box forming machine in cycles or strokes per minute and $f_2$ represents the frequency or number of cycles in strokes per minute of the cutter machine 30. The quantity $s$ in the above relationship represents the number of degrees in shift between the leading or trailing edge of a pulse 176 with respect to a pulse 174. Thus, with higher frequencies, as suggested in FIG. 11, wherein the pulses 176a tend to move towards the left relative to the pulses 174, the angular distance $s$ of interest is the distance 178, in degrees, between the trailing edge of a pulse 174 and a leading edge of a pulse 176. On the other hand, with lower frequencies, as suggested in FIG. 12, wherein the pulses 176b migrate towards the right relative to the fixed pulses 174, the angular distance $s$ of interest is the distance 180, in degrees, between the trailing edge of the pulses 176 and the leading edge of the pulses 174.

The above relationship for N or the number of strokes to turn off the motor 154 when the drives are out of synchronism requires that the answer be rounded off to the next highest full integer. Thus, with each of the lands 68 and 72 including an angle of 120° and with the land 84 extending an angle of 40°, the distance 178, for the initial conditions shown in FIG. 11, is equal to 160°. With a frequency $f_1$ equal to 30 strokes per minute and the frequency $f_2$ equal to 36 strokes per minute, N is equal to 2.66 cycles. As shown in FIG. 11, shut off of the motor 154 takes place on the third cycle. Similarly, for the pulses 176b, the distance of interest 180 is equal to 40° and with the frequency $f_2$ equal to 25.7 strokes per minute, the above relationship gives N to be equal to 0.665 cycles. Accordingly, shutoff of the motor 154 takes place on the first cycle, as shown in FIG. 12. Since the land 68, 72 and 84 can be selected to include any desired number of degrees, the corresponding pulses 172, 174 and 176 can be changed in width to effectively increase or decrease the number of strokes which are required for a given deviation in motor synchronization prior to shutoff of the motor 154. Stated otherwise, the distance $s$ in the above relationship can be varied at will. It is not deemed desirable, however, to decrease $s$ to too small a value by unnecessarily enlarging the land 72 since in this condition, for a given frequency deviation, the motor 154 will turn off at an undesirably high rate. As mentioned above, this is undesirable because of the additional wear which is imparted upon the motor and the various relay contacts utilized in the synchronizing circuit 106.

What has been described above is a box making machine 10 which includes a plurality of component machines actuated by independent drive means. The synchronization circuit 106 synchronizes the operation of the cutter machine 30 in the box forming machine 40, including the reciprocating arm 42, this synchronization being important in order to continuously feed blanks 48 to the box forming machine 40 in an orderly manner. Because the imprinting machine 26 and the die press 28 must be synchronized with the cutter machine 30, cams 86 and 90 are provided which actuate these machines during the cutting stroke of the cutter machine. Safety means are incorporated into the electrical circuit 106 which discontinues the operation of the cutter machine and the pinch rollers 32 whenever an abnormal tension condition exists in the web 14. This is achieved by use of the relay coil 156 whose contacts 158 are in series connection with the motor 154 and which is deenergized by the opening of the switches 56 and 58.

The above described box making machine 10 provides the required synchronization with a simple arrangement which is economical to manufacture. By permitting the use of individual, independently driven component machines, an improved box making machine 10, or any other automated-type machine, can be formed by selecting individual or component machines which have optimum characteristics. This is frequently not possible or available when a single, commonly driven machine is used.

Numerous alterations of the structure herein disclosed will suggest themselves to those skilled in the art. However, it is to be understood that the present disclosure relates to a preferred embodiment of the invention which is for purposes of illustration only and is not to be construed as a limitation of the invention.

What is claimed is:

1. A box making machine comprising
supply means for supplying a continuous web of material out of which boxes are to be formed;
die press means for punching out portions of the web at predetermined locations on the latter;
cutter means for cutting the web into blanks suitable to be formed into boxes, said cutter means including first drive means for actuating said cutter means and for advancing the web;
box forming means for operating on the blanks and for forming the same into boxes, said box forming means including second drive means for actuating said box forming means;
synchronizing means for synchronizing said box forming means with said cutter means to overcome fluctuations in speed of the operation of said first and second drive means, said synchronizing means including a plurality of detection means each cooperating with one of said cutter and box forming means for detecting at least one portion of each cycle of one of said cutter and box forming means and at least two portions of each cycle of the other of said cutter and box forming means and for causing synchronization only upon detection by said plurality of detection means in a predetermined sequence; and
circuit means for maintaining the operation of said cutter means upon continued detection by said detection means in said predetermined sequence and for terminating the operation of said cutter means when detection is other than in said predetermined sequence.

2. A box making machine as defined in claim 1, further comprising imprinting means for printing information on the web before the latter is cut by said cutter means.

3. A box making machine as defined in claim 1, wherein said first and second drive means comprise motors whose speeds may fluctuate from a nominal speed, said synchronizing means comprising first detection means for detecting a first portion of every cycle of said box forming means; second detection means for detecting a second portion of every cycle of said box forming means; third detection means for detecting a portion of every cycle of said cutter means, synchronization being attained only when detection takes place successively by said first, third and second detection means respectively without simultaneous detection by said second and third detection means, said circuit means for initiating the operation of said cutter means upon each detection by said first detection means of said first cycle portion of said box forming means and terminating the operation of said cutter means only upon detection by said second detection means of said second portion of a cycle of said box forming means prior to or simultaneously with detection by said third detection means of said portion of a cycle of said cutter means.

4. A box making machine as defined in claim 1, wherein said supply means comprises a rotatably mounted supply roll; an oscillating rod pivotally mounted at one end thereof and provided at the other end thereof with a dancer roller around which the web is guided, the tension on the web regulating the angular position of said rod; and clutch means cooperating with said supply roll for unwinding said roll when said rod reaches a first position corresponding to a predetermined high tension of the web and for preventing unwinding of said roll when said rod reaches a second position corresponding to a low tension of the web.

5. A box making machine as defined in claim 4, wherein said clutch means includes switches having actuators disposed at said first and second positions respectively corresponding to said predetermined high and low tensions of the rod.

6. A box making machine as defined in claim 1, wherein said first drive means comprises a motor whose operation is controlled by said synchronization means, said supply means comprising a rotatably mounted supply roll, an oscillating rod pivotally mounted at one end thereof and provided at the other end thereof with a dancer roller around which the web is guided, the tension on the web regulating the angular position of said rod; said synchronization means including switch means disposed for engagement with said rod at positions of the latter corresponding to excessively low and high tensions in the web, and circuit means for deenergizing said motor in response to actuation of said switch means.

7. A box making machine as defined in claim 6, wherein said circuit means includes latching relay means connected to said motor for deenergizing the latter in response to actuation of said switch means independently of synchronization between said first and second drive means; and reset means cooperating with said relay means for resetting the latter subsequent to a deenergization of said motor.

8. A box making machine as defined in claim 1, wherein said die press means is actuated by an independent drive means, said synchronization means being connected to said die press drive means for synchronizing the operation of the latter with the operation of said first and second drive means.

9. A box making machine as defined in claim 8, wherein said synchronization means includes cam means associated with said cutter means for monitoring each cycle of the latter and detecting that portion of each cycle where said cutter means cuts the web; and switch means engageable with said cam means for actuating said die press drive means during said cutting portion of each cycle of said cutter means.

10. A box making machine as defined in claim 1, further comprising a support rail extending between said box forming means and said cutter means; and a reciprocating arm suitable for engaging a blank deposited by said cutter means on said support rail, said arm completing one full reciprocation during each cycle of said box forming machine to draw a blank deposited on said support rail by said cutter means into said box forming machine.

11. A box making machine comprising supply means for supplying a continuous web of material out of which boxes are to be formed; die press means for punching out portions of the web at predetermined locations on the latter; cutter means for cutting the web into blanks suitable to be formed into boxes, said cutter means including first drive means for actuating said cutter means and for advancing the web; box forming means for operating on the blanks and for forming the same into boxes, said box forming means including second drive means for actuating said box forming means; synchronizing means for synchronizing said box forming means with said cutter means to overcome fluctuations in speed of the operation of said first and second drive means, said first and second drive means including motors whose speeds may fluctuate from a nominal speed, said synchronizing means comprising first detection means for detecting a first portion of every cycle of said box forming means, second detection means for detecting a second portion of every cycle of said box forming means, and third detection means for detecting a portion of every cycle of said cutter means, synchronization being attained only when detection takes place successively by said first, third and second detection means respectively without simultaneous detection by said second and third detection means, said circuit means initiating the operation of said cutter means upon each detection by said first detection means of said first cycle portion of said box forming means and terminating the operation of said cutter means only upon detection by said second detection means of said second portion of a cycle of said box forming means prior to or simultaneously with detection by said third detection means of said portion of a cycle of said cutter means, said first and second detection means including first and second cam means mounted for common rotary movement, each cam means completing one full turn for each full cycle of said box forming machine, said third detection means comprising third cam means mounted for completing one full turn for each full cycle of said cutter means, said circuit means including switches each having an actuator engageable with a land of a respective cam means.

12. A box making machine as defined in claim 11, wherein said circuit means comprises a source of electrical energy and first and second latching relay means, the switch associated with said first cam means being normally open and arranged to connect said first relay means to said source of electrical energy and actuate said first relay means in response to actuation by said first cam means, said first relay means being connected to said second relay means to energize the latter in response to energization of the former, the switch means associated with said second and third cam means being normally closed switches arranged to unlatch said respective first and second relay means when opened by said respective second and third cam means, said second relay means being connected to the motor of said cutter means for actuating the latter with energization of the former, whereby said second relay means remains energized during synchronization of said motors only when said switch associated with said third cam means is actuated and released prior to actuation by said second cam means of the switch associated with the latter subsequent to each actuation of the switch associated with said first cam means.

* * * * *